United States Patent [19]

Gilmore

[11] 4,338,743
[45] Jul. 13, 1982

[54] SAFETY SYSTEM FOR WEED DESTROYING APPARATUS OPERABLE TO ALTERNATIVELY SUPPLY AUXILIARY POWER

[75] Inventor: Thomas P. Gilmore, Wauwatosa, Wis.

[73] Assignee: Allis-Chalmers Corporation, Milwaukee, Wis.

[21] Appl. No.: 243,839

[22] Filed: Mar. 16, 1981

[51] Int. Cl.³ .................................. A01M 21/00
[52] U.S. Cl. ............................................. 47/1.3
[58] Field of Search .................................. 47/1.3

[56] References Cited

U.S. PATENT DOCUMENTS

| | | | |
|---|---|---|---|
| 3,919,806 | 11/1975 | Pluenneke et al. | 47/1.3 |
| 4,177,603 | 12/1979 | Dykes | 47/1.3 |
| 4,198,781 | 4/1980 | Dykes | 47/1.3 |

Primary Examiner—Robert E. Bagwill
Attorney, Agent, or Firm—Lee H. Kaiser

[57] ABSTRACT

Weed destroying apparatus carried on a vehicle has a generator; a step-up transformer having its secondary winding coupled to electrodes for contacting and killing weeds; a programmable semiconductor logic array; a first contactor coupled to an output of the logic array for connecting the generator to the transformer primary winding in the weed killing mode; a second contactor coupled to an output of the logic array for connecting the generator to electrical outlets for supplying electrical power to auxiliary farm equipment in a standby mode; a run/standby switch for providing binary signals to the logic array indicative as to whether the apparatus is to operate in the weed killing mode or the standby mode; a plurality of safety systems each of which has redundant interlock means for preventing an unsafe condition in which high voltage would be a hazard in the weed killing mode and sensing means for providing binary signals to the logic array indicative of whether each interlock means is in the safe condition or an unsafe condition; and a generator frequency interlock for detecting generator frequency in the standby mode and for applying binary signals to the logic array indicative of whether generator frequency is within a predetermined range.

8 Claims, 16 Drawing Figures

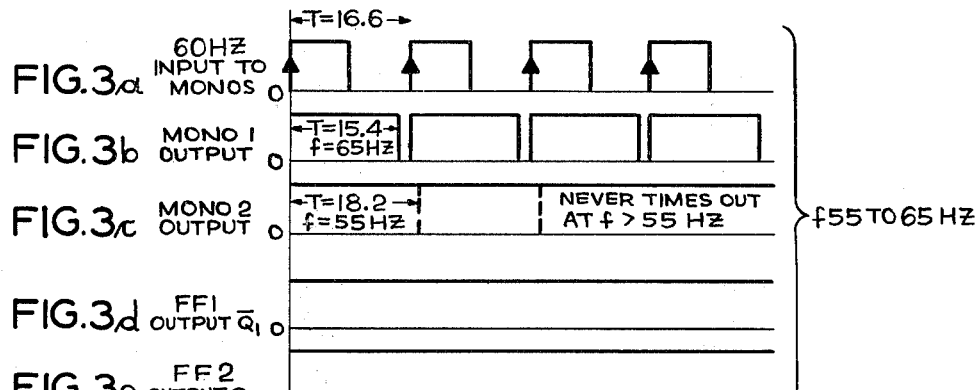
FIG. 2
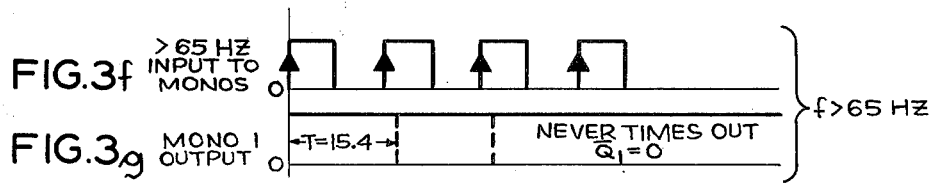
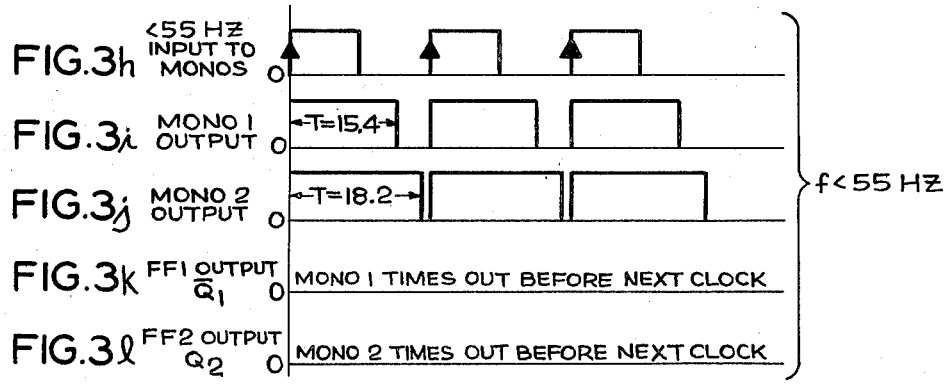

SAFETY SYSTEM FOR WEED DESTROYING APPARATUS OPERABLE TO ALTERNATIVELY SUPPLY AUXILIARY POWER

This invention relates to electroculture and in particular to apparatus for destroying weeds by application of electricity thereto and for alternatively supplying electrical power to auxiliary farm equipment.

BACKGROUND OF THE INVENTION

Electrical apparatus for destroying weeds is disclosed in such patents as U.S. 3,919,806 wherein a source of high voltage electricity is carried on a vehicle having a sharp-edge metallic ground contact wheel, or coulter, for connecting the low side of the high voltage source to the ground, and electrodes carried on the vehicle and connected to the high side of the voltage source are positioned to contact the weeds to transfer electrical current thereto to kill the weeds. The high voltage source may comprise an electrical generator driven by the power take-off shaft of the tractor pulling the vehicle and a transformer for stepping up the generator voltage. Grounding and safety features are provided to prevent the high voltage from harming the vehicle operator or bystanders. Specifically, U.S. Pat. No. 3,919,806 discloses four normally open interlock switches connected in series which must be closed in order to energize the transformer, and such interlock switches are controlled by respectively: (a) the transformer cover which must be closed; (b) the ground contact wheel which must be in position to penetrate the ground; (c) the "run" switch which is manually held by the operator and (d) means to indicate that the vehicle is traveling above a predetermined speed.

Such safety features substantially reduce hazards to the operator and bystanders, but the interlocks are not tamper-proof, can easily be disabled, and do not provide optimum reliability. Failure of a single interlock can result in a hazardous condition of the weed destroying apparatus. Also, such known weed killing apparatus does not have immediately-visible warning of the electrical hazard. If the coulter interlock switch is jammed closed, the high voltage source may be energized while the vehicle is at rest, and this presents a hazard to bystanders, and also to the vehicle operator since loss of ground contact can cause the vehicle or the tractor to assume the high potential at the output side of the transformer. Still further, even when all interlocks are operating satisfactorily and the vehicle is at rest, the residual generator voltage is applied to the primary side of the transformer and the voltage produced in the secondary is still high enough to create a hazard.

OBJECTS OF THE INVENTION

It is an object of the invention to provide an apparatus which may alternatively be used in the weed killing mode wherein high voltage is applied to the elecrodes or in a standby mode wherein electrical power is supplied from the generator to electrical outlets for operating auxiliary farm equipment while the vehicle is at rest. Another object is to provide such weed killing apparatus wherein the generator is connected to the step-up transformer through a contactor which is open when the apparatus is in the standby mode so no residual voltage is applied to the transformer which could be a hazard while the vehicle is at rest. A still further object is to provide weed killing apparatus which turns off the electrical power to the electrical outlets in the standby mode when the frequency of the generator varies beyond 60 Hz $\neq$5 Hz to thereby prevent auxiliary apparatus from burning up as could occur if operated for long periods of time at frequencies substantially above or below 60 Hz.

A further object is to provide weed destroying apparatus having a first contactor for connecting the generator to the step-up transformer in the weed killing mode and a second contractor for connecting the generator to electrical outlets in the standby mode and which senses if either contactor fails to open when the STOP switch is operated (or when an interlock transfers to the unsafe condition) and removes the generator field to thereby prevent operation of the apparatus if a contactor is blocked closed.

It is a further object of the invention to provide an improved safety system for electrical weed destroying apparatus which protects the vehicle operator under all operating conditions and reduces hazards to bystanders to the extent that such weed destroying apparatus is no more dangerous than other types of farm equipment.

Another object of the invention is to provide such an improved safety system for electrical weed destroying apparatus which is tamper-proof. Still another object is to provide such an improved safety system wherein all protective systems fail safe or require plural simultaneous failures to create a condition that is hazardous to the operator or to a bystander.

A still further object of the invention is to provide an improved safety system for electrical weed killing apparatus which uses electrical logic means to increase the reliability and reduce the cost and complexity of the safety system.

Another object is to provide improved safety apparatus for electrical weed destroying apparatus which used redundant interlock means in the weed killing mode to prevent unsafe conditions wherein the high voltage source could be a hazard to the vehicle operator or to bystanders, a programmable semiconductor logic array, sensors means for providing binary input signals to said logic array indicative of whether the interlock means is in the safe or unsafe condition, and wherein the logic array is programmed to prevent energization of the high voltage source if the binary input signals indicate that any interlock means is jammed or has failed in the unsafe condition.

Another object is to provide an improved safety system for electrical weed destroying apparatus which provides immediately-visible warning of the electrical hazard created by the apparatus and also provides visual and aural indications to the operator when a safety interlock has been bypassed or is jammed closed. A still further object is to provide an improved safety system for electrical weed killing apparatus which uses redundant safety interlocks to effectively ground the vehicle and to prevent energization of the high voltage source in the weed killing mode until the vehicle is traveling at a predetermined speed and which de-energizes the voltage source if any one safety interlock is by-passed or fails in an unsafe condition.

SUMMARY OF THE INVENTION

Weed destroying apparatus in accordance with the invention is carried on a vehicle and has electrodes for contacting and destroying weeds when in a weed killing mode and electrical outlets for supplying electrical power to auxiliary farm equipment when in a standby mode and the vehicle is at rest; a generator; a step-up transformer having its secondary winding connected to the electrodes; a first contactor for connecting the generator to the primary winding of the transformer; a second contactor for connecting the generator to the electrical outlets; a semiconductor programmable logic array; first and second pilot relay means coupled to different outputs of the logic array for completing energizing circuits to the first and second contactors respectively, and run/standby switch means for selectively applying binary signals to an input of the logic array indicative of whether the apparatus is to operate in the weed destroying mode or in the standby mode. Generator frequency interlock means sense generator frequency in the standby mode and provide binary signals to an input of the logic array indicative of whether generator frequency is within the range of 60≠5 cycles and which cause the logic array to change the binary voltage on an output to release the second contactor if generator frequency is outside such range and thus prevent burning up of electrical motors of auxiliary farm equipment. The apparatus senses whether the operated contactor opens when the STOP switch is pushed or if an interlock transfers to an unsafe condition and ruptures a fuse to remove the generator field if the contactor is blocked closed.

First and second safety systems are operable in the weed killing mode each of which comprises redundant interlock means for preventing an unsafe condition in which the high voltage source would be a hazard to the vehicle operator or to a bystander, sensor means associated with each interlock means provide binary signal inputs to the logic array indicative of whether the interlock means is a safe or an unsafe condition, and the logic array is programmed to provide an output signal to effect closure of the first contactor only when the binary signal inputs indicate that all of the interlock means are in safe condition. Preferably the first safety system includes first and second coulters for effectively grounding the vehicle, the second safety system includes first and second tachometer means for sensing that the vehicle is traveling at a predetermined speed, and the apparatus also includes seat switch interlock means which is in the safe condition when the operator is sitting on the vehicle seat and sensor means for providing binary signal inputs to the logic array indicative of whether the seat switch interlock means is in the safe or unsafe condition. The apparatus has an interlock light, and the logic array is programmed to provide an output signal to effect turning on the interlock light when an interlock means is in unsafe condition.

DESCRIPTION OF THE DRAWINGS

These and other objects and advantages of the invention will be more readily apparent from the following detailed description when taken together with the accompanying drawing wherein:

FIG. 2 is a program table for the semiconductor logic array used in the FIG. 1 apparatus; and FIGS. 3a–3e illustrate pulses within the frequency regulator of the FIG. 1 apparatus when generator frequency is between 55 and 65 Hz; FIGS. 3f and 3g illustrate such pulses when generator frequency is above 65 Hz; and FIGS. 3h–3l illustrate such pulses when generator frequency is below 55 Hz.

DETAILED DESCRIPTION

Weed destroying apparatus embodying the invention may be carried on a vehicle pulled by a tractor through a field so that the conductive electrodes E (shown in FIG. 1c) contact the weeds to be destroyed, as disclosed in aforementioned U.S. Pat. No. 3,919,806, or alternatively the apparatus may be mounted on the three point hitch of a tractor.

Figure 1A:
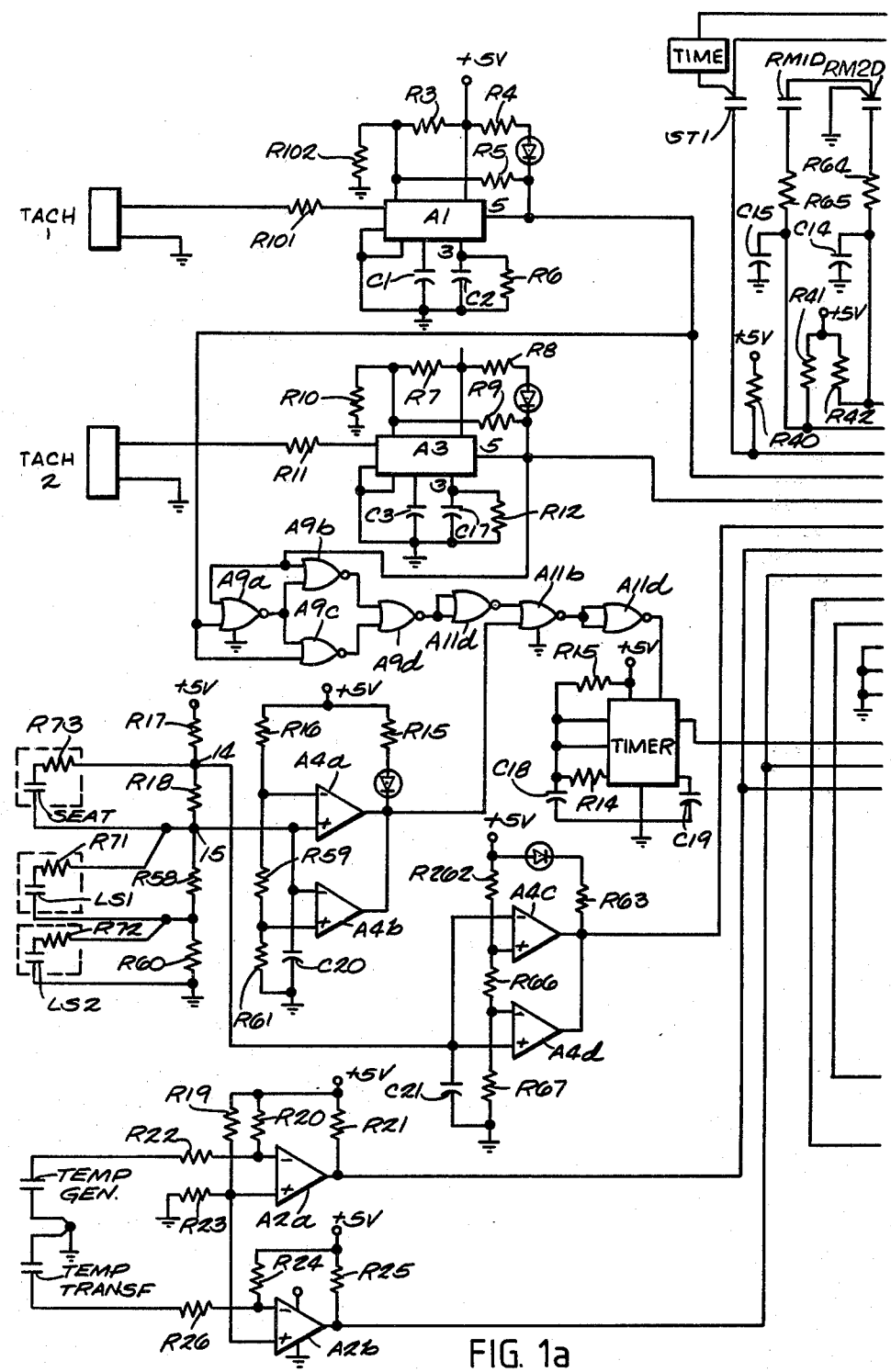
FIGS. 1a, 1b and 1c together comprise a circuit diagram of electrical weed destroying apparatus embodying the invention.
Figure 1B:
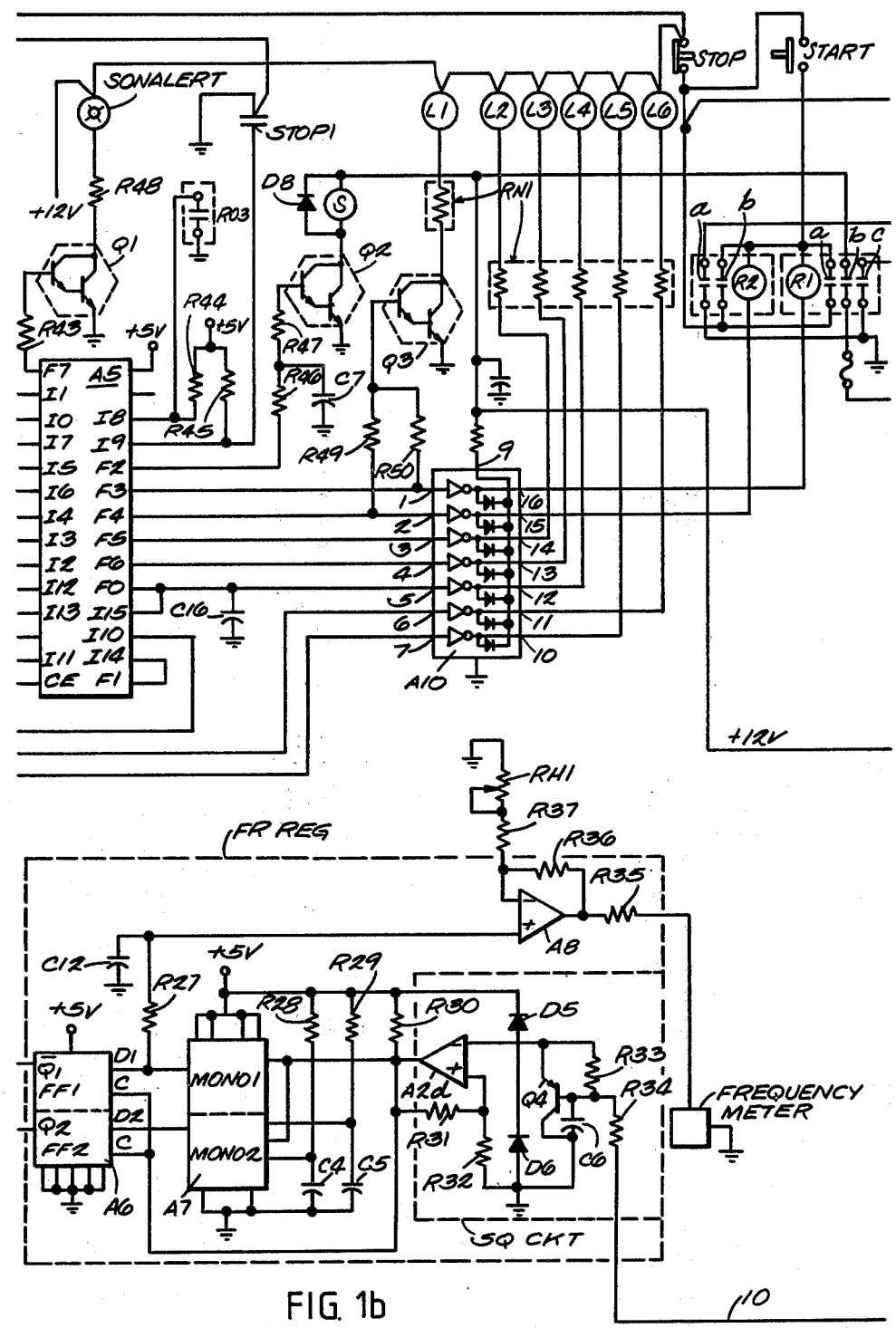
Figure 1C:
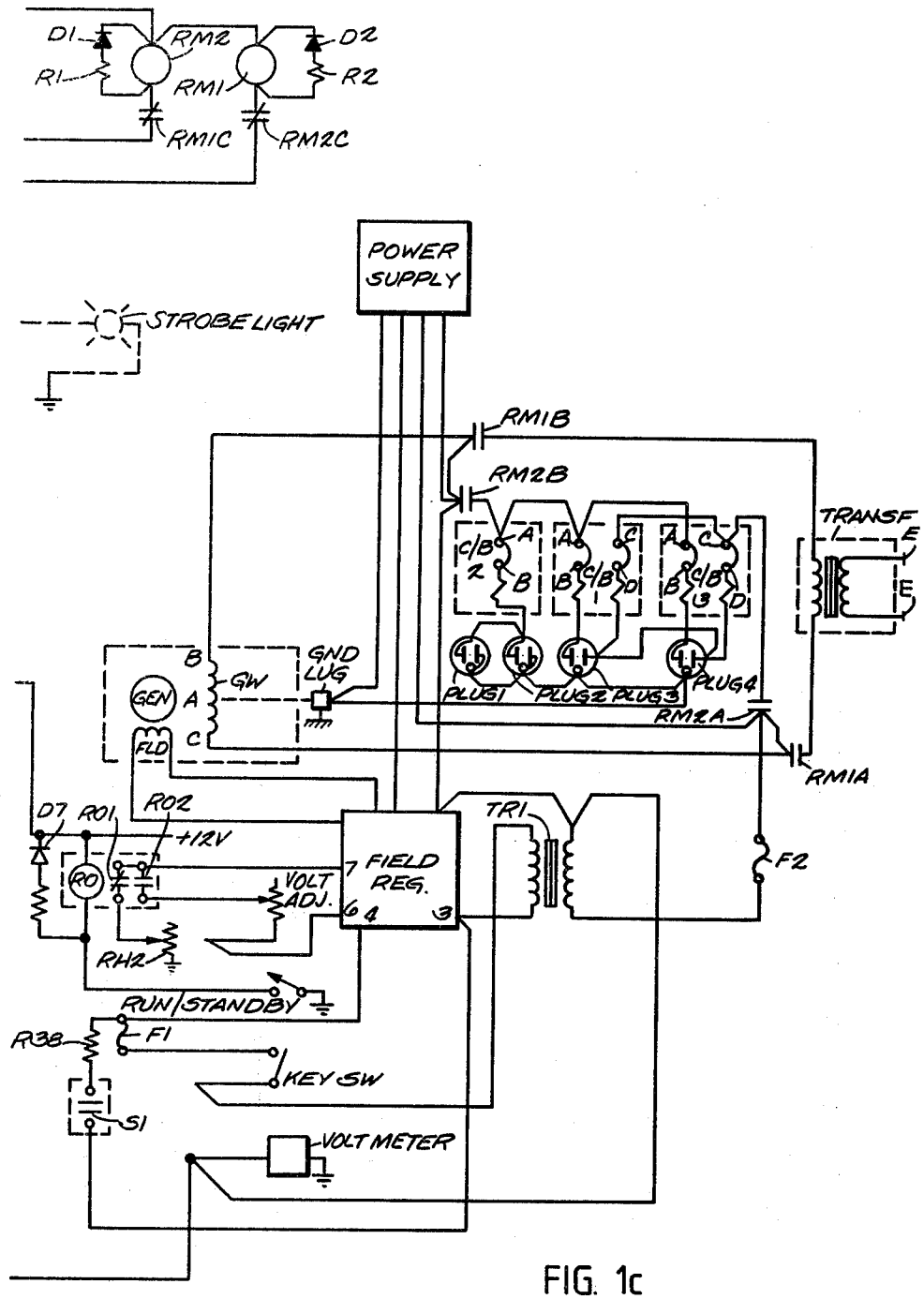

Referring to FIG. 1c, the weed destroying apparatus includes a suitable electrical generator GEN which may be driven by the power take-off shaft of a tractor and has an armature winding GW whose midtap A is connected to a ground lug GND LUG and whose ends B and C are respectively connected through the normally open contacts RM1B and RM1A of a main contactor RM1 to opposite ends of the primary winding of a step-up transformer TRANSF which increases the voltage so that a sufficiently high voltage, such as 14.4 kilovolts, is present at electrodes E (which are connected to the ends of the transformer secondary winding) to destroy any weeds that contact electrodes E. Main contactor RM1 is operated when the vehicle is traveling above a predetermined speed and all safety interlocks and sensors are operating normally (so that binary 1 voltage can be present on the F3 output of logic array A5 as described hereinafter), and the vehicle operator pushes the START button switch to: (a) energize the coil of pilot relay R1 from the regulated +12 V source through the contacts of the STOP push button switch; and (b) close contacts ST1 and thereby connect binary 0 voltage to input I7 of logic array A5.

R1 OPERATES

Closes its "a" contacts to latch itself to the regulated power supply +12 V;

Closes its "b" contacts to connect power supply +12 V to one side of a STROBE light whose other side is grounded; and Closes its "c" contacts to connect ground through normally closed contacts RM2C of an output contactor RM2 to one side of coil RM1 whose other side is connected through the STOP switch contacts to power supply +12 V.

The flashing STROBE light provides an immediately visible warning to bystanders that the apparatus is energized.

RM1 OPERATES

Closes contacts RM1A and RM1B to connect generator winding GW to the primary of transformer TRANSF; and Opens contacts RM1C to prevent operation of contactor RM2; and Closes contacts RM1D to connect ground (binary 0 voltage) to input IO of the programmable semiconductor logic array A5 and thus indicate that main contactor RM1 is closed.

The conditions under which logic array A5 provides binary 1 voltage on its F3 output to permit operation of pilot relay R1 will be described hereinafter.

Logic array A5 may be a bipolar field programmable semiconductor logic array adapted to provide binary voltages on its outputs as a function of the program entered therein and the binary istruction signals received on its inputs such as the type 82S100 available from Signetics Corp., and the program table for A5 is shown in FIG. 2.

A normally open key switch KEY SW may be actuated by the vehicle operator to excite the field winding FLD of generator GEN (assuming that the speed of the generator rotor is sufficiently high). Closure of the KEY SW contacts connects the secondary winding of an isolating transformer TR1 through a fuse F1 to terminals 3 and 4 of a field regulator FIELD REG which, in response thereto, supplies DC voltage at its output terminals to excite the field winding FLD of the generator.

A RUN/STANDBY switch may be actuated by the vehicle operator to the closed RUN position when it is desired to destroy weeds or, alternatively, to an open STANDBY position when it is desired that the apparatus remain at rest and provide alternating current power at four outlets PLUG 1, PLUG 2, PLUG 3 and PLUG 4 to operate auxiliary farm equipment.

WEED DESTROYING MODE

In the weed mode the operator turns on the key switch to energize the generator and actuates the RUN/STANDBY switch to the closed RUN position. At this time only "interlock" light L4 will light, thereby indicating that one or more interlocks are not set for the weed mode. The operator can now lower the coulters in the ground and start the vehicle in motion while seated on the tractor seat, thereby closing coulter limit switches LS1 and LS2 and the SEAT switch. When the coulters start to turn and the speed sensors A1 and A3 sense that vehicle speed is above 0.6 miles per hour, "interlock" light L4 will turn off and the "run" light L3 will turn on. At this time the START button can be pushed to close main contactor RM1, thereby energizing electrodes E. The "on" light L1 will also light to indicate the system is running. Contactor RM1 will remain energized until the operator hits the STOP button or an interlock opens. If an interlock opens and causes main contactor RM1 to open, interlock light L4 will turn on, the "on" light L1 will turn off, the "run" light L3 turns off, and a SONALERT alarm sounds.

In greater detail, the operator initially turns on the key switch KEY SW to energize terminals 3 and 4 of the field regulator FIELD REG of the generator from the 120 volt secondary winding of isolating transformer TR1. The primary winding of isolating transformer TR1 receives 220 volts from generator winding GW through a fuse F2. The operator then actuates the RUN/STANDBY switch to the closed RUN position which connects ground to one side of the coil of a relay RO whose other side is connected to the power supply +12 V.

RELAY RO OPERATES

Opens its RO1 contacts to open the circuit to rheostat RH2;

Closes its RO2 contacts to connect the VOLT ADJ potentiometer across terminals 6 and 7 of the field regulator FIELD REG to thereby permit the operator to vary the generator voltage; and Closes its RO3 contacts to couple ground, or binary 0 voltage to input I8 of logic array A5.

If all interlocks are not in the safe position for the weed destroying mode, logic array A5 will provide binary 1 voltage on its F0 output to light interlock lamp L4. Assume, for example, that the operator is not sitting down so the SEAT switch is open. This will result in a binary 0 voltage from comparator A4c applied to input I4 of logic array A5, and the FIG. 2 program table shows that A5 can only provide a low (L), or binary 0 active level (A) on its F0 output to extinguish lamp L4 when input I4 is at binary 1 voltage (and inputs I2, I3, I5, I6, I8 and I11 are binary 0 voltage).

Output F0 of A5 is coupled to input pin 5 of a Darlington transistor array buffer amplifier A10 which, in response thereto, provides binary 1 voltage on its output pin 12 which is connected to one side of interlock lamp L4 through one element of a muliple resistance array RN1. A10 may be a silicon monolithic intergrated circuit such as type MC1413 available from Motorola Inc. and is used to drive the panel lights and the pilot relays.

GROUNDING COULTER INTERLOCKS

The weed killing apparatus utilizes redundant, i.e., two grounding coulters (not shown) which penetrate the ground to assure that the frame of the vehicle does not assume the high potential from the step-up transformer TRANSF and thus become a hazard to the operator or bystanders. Limit switches LS1 and LS2 are provided on the coulters to insure that both coulters are solidly grounded before transformer TRANSF can be energized. The apparatus de-energizes transformer TRANSF if either coulter does not penetrate the ground so the associated limit switch LS1 or LS2 is open.

Two comparators A4a and A4b sense whether coulter limit switches LS1 and LS2 agree or disagree. Two comparators A4C and A4d sense whether the operator's SEAT switch is open or closed and also detect whether either coulter limit switch LS1 or LS2 is open.

Four resistances R17, R18, R58 and R60 connected in series between a power source +5 V and ground form a voltage divider. The junction point 15 between R18 and R58 is connected: (a) in series with a resistance R71 and limit switch LS1 across R58, and (b) to the noninverting input of comparator A4a which has a predetermined potential applied to its inverting input derived at the junction between resistances R16 and R59 of a voltage divider comprising resistances R16, R59 and R61 connected between source +5 V and ground; and (c) to the inverting input of a comparator A4b which has a predetermined voltage applied to its non-inverting input derived at the junction between R59 and R61. A resistance R72 is connected in series with limit switch LS2 across R60. A normally open SEAT switch is connected in series with a resistance R73 across R18. Junction point 14 between R17 and R18 is connected to: (a) the inverting input of a comparator A4c which receives a predetermined voltage on its non-inverting input derived at the junction between R66 and R63 of a voltage divider comprising three resistances R62, R66 and R67 connected between source +5 V and ground, and (b) the noninverting input of a comparator A4d which receives a predetermined voltage on its inverting input derived at the junction between R66 and R67.

When LS1, LS2 and the SEAT switch are open, or in the unsafe condition, the voltage at junction point 14 is higher than the predetermined voltages applied to comparators A4c and A4d whose outputs are commoned, so the binary 0 output voltage from A4c is coupled to input I4 of logic array A5, thereby providing: (a) binary 1 voltage on output F0 to effect lighting of interlock lamp L4 and (b) binary 0 voltage on output F3 to prevent operation of pilot relay R1. Output F0 of A5 is coupled to input I15 of A5, and it will be noted from FIG. 2 that A5 can only provide a high (H) binary 1 output active level (A) on F3 when input I15 is binary 0. When LS1 an LS2 and the SEAT switch are closed, or in the safe condition, the voltage at junction point 14 is: (a) lower than the predetermined voltage applied to A4c so it provides binary 1 voltage output; and (b) higher than the predetermined voltage applied to A4d so its output is also binary 1. The resulting binary 1 voltage from the commoned outputs of A4c and A4d is coupled to input I4 of logic array A5 to indicate both coulters penetrate the ground and the SEAT switch is closed, thus causing logic array A5 to provide binary 0 voltage (shown as low (L) active level (A) in FIG. 2) on the F0 output lead to turn off interlock lamp L4. The binary 0 from output F0 is coupled to input I15 of A5 so logic array A5 provides binary 1 voltage (shown as high (H) active level (A) in FIG. 2) on output F3 to permit operation of pilot relay R1.

If the operator should stand up, the SEAT switch would open, and the voltage at junction point 14 would again become higher than the predetermined voltages applied to A4c and A4d with the result that binary 0 voltage is applied to input I4 of logic array A5 to provide binary 1 on output F0 to thereby turn on the interlock lamp L4 and also provide binary 0 on output F3 to release pilot relay R1.

If either coulter comes out of the ground while the operator remains seated, limit switch LS1 or LS2 would open with the result that the voltage at junction point 14 would again become higher than the predetermined voltages applied to A4c and A4d, and binary 0 voltage output from A4c is applied to input I4 of logic array A5 to thereby turn on the interlock light L4 and release relay R1.

When both coulters penetrate the ground, LS1 and LS2 are closed, and the voltage at junction point 15 is lower than: (a) the predetermined voltage at the inverting input of A4a, so its output is binary 0 voltage and (b) the predetermined voltage at the non-inverting input of A4b, so its output is binary 1 voltage. The outputs of A4a and A4b are commoned and the resulting binary 0 voltage is coupled to one input of a NOR gate A11b so its output is binary 1 voltage. The output of A11b is inverted by gate A11d and applied to a TIMER which, in response thereto, provides binary 0 voltage to input I10 of logic array A5. Under such safe interlock conditions with input I10 at binary 0, output F7 of A5 is logic 0.

Comparators A4a sense whether limit switches LS1 and LS2 agree. If they do not, thereby indicating that one coulter has come out of the ground, a SONALERT horn is turned on which beeps at one second intervals. If either coulter should come out of the ground, one limit switch (e.g., LS1) would open, and the voltage at junction point 15 would become higher than the predetermined voltage applied to A4a so its output would become binary 1 voltage. The resulting binary 1 voltage is applied to gate A11b to change its output to binary 0 voltage. The output from A11b is inverted by gate A11d which provides binary 1 voltage to the TIMER which, in response thereto, provides binary 1 voltage pulses to input I10 of logic array A5. The binary 1 pulses on I10 result in intermittent binary 1 voltage pulses on output F7 of A5 which turn on a Darlington transistor array Q1. When Q1 turns on, ground is connected to one side of the SONALERT horn and causes it to beep.

VEHICLE SPEED INTERLOCKS

In order to energize step-up transformer TRANSF, both grounding coulters must penetrate the earth, the operator must be in his seat, the vehicle must be traveling above a predetermined speed, for example, 0.6 mph, and the operator must push the START switch pushbutton. The requirement regarding vehicle speed insures that bystanders are not in the vicinity of the weed-destroying electrodes E when transformer TRANSF is energized. Vehicle speed may be sensed by tachometers TACH 1 and TACH 2 actuated by the vehicle wheels, or by the grounding coulters. Redundant tachometer interlocks are used to insure that a single unsafe condition, i.e., failure of a single safety interlock, does not create a hazardous condition. Further, failure of both tachometers to agree provides a aural indication to the operator so that it can be serviced.

TACH 1 and TACH 2 generate pulses at a frequency proportional to vehicle speed which are coupled through resistances R101 and R11 respectively to semiconductor frequency-to-voltage converters A1 and A3 which may be of the LM2907-8 type available from National Semiconductor Company. Frequency-to-voltage converters A1 and A3 include: (1) a conversion stage (not shown) which provides a DC voltage at pin 3 whose magnitude increases linearly with pulse frequency, and (2) a comparator stage (not shown) which compares the DC voltage on pin 3 to a predetermined voltage (established by the R102, R3 network of A1 and the R10, R7 network of A3) and provides binary 1 voltage on output pin 5 when the vehicle is at rest and flips the output on pin 5 to binary 0 voltage when the vehicle attains the desired 0.6 mph speed, thereby permitting energization of the weed-contacting electrodes E. The binary 1 voltage outputs from pins 5 of A1 and A3 when vehicle speed is less than 0.6 mph are coupled to inputs I5 and I6 respectively of logic array A5 and, as shown in the FIG. 2 program table, maintain: (a) binary 1 voltage (i.e. high (H) active level) on logic array output F0 to keep interlock lamp L4 lighted, and (b) binary 0 voltage on logic array output F3 to prevent operation of pilot relay R1.

When vehicle speed exceeds 0.6 mph, the outputs of A1 and A3 flip to logic 0 which is coupled to inputs I5 and I6. In response thereto, A5 provides: (a) binary 0 voltage on its F0 output to turn off the interlock lamp L4, and (2) logic 1 on its F3 output to permit operation of pilot relay R1.

NOR gates A9a, A9b, A9c, and A9d sense whether the outputs of the two speed sensors match and result in turning on intermittent SONALERT horn if they do not match. The output of A1 is coupled to one input of each NOR gate A9a and A9c, and the output of A3 is coupled to one input of each NOR gate A9a and A9b. The outputs of gates A9b and A9c are inputs to NOR gate A9d whose output is inverted by a NOT gate A11a. The output of A11a is coupled to one input of a NOR gate A11b whose output is coupled through a NOT gate A11d to input pin 4 of TIMER which provides a binary 0 output voltage to input I10 of logic array A5 when the vehicle is at rest.

When the vehicle speed is above 0.6 mph, the SEAT switch is closed, and both coulters are in the ground, the output voltages are as follows:

| A1 | 1 |

-continued

| | |
|---|---|
| A3 | 1 |
| A9a | 0 |
| A9b | 0 |
| A9c | 0 |
| A9d | 1 |
| A11a | 0 |
| A11b | 1 |
| A11d | 0 |
| TIMER | 0 |

Assume that TACH 2 becomes disabled. The output voltages change as follows:

| | |
|---|---|
| A1 | 1 |
| A3 | 0 |
| A9a | 0 |
| A9b | 1 |
| A9c | 0 |
| A9d | 0 |
| A11a | 1 |
| A11b | 0 |
| A11d | 1 |
| TIMER A12 | 1 (intermittent) |

The resulting binary 1 voltage pulses from TIMER are coupled to input I10 of logic array A5 and provide intermittent binary 1 voltage pulses from output F7 of A5 to NPN Darlington transistor array Q1, which turns on to intermittently supply ground to one side of the SONALERT horn whose other side is coupled to the power supply +12 V. This causes the SONALERT horn to sound intermittently and warn the operator that an unsafe condition exists.

GENERATOR TEMPERATURE INTERLOCK

If the temperature of the generator GEN becomes excessive, weed destroying operation is prevented. A temperature sensing switch embedded in generator GEN has a pair of normally open contacts TEMP GEN. One TEMP GEN contact is grounded and the other is connected through a resistance R22 to the inverting input of a comparator A2a whose inverting input normally sees +5 V volts through a resistor R20 and whose non-inverting input normally has +2.5 volts applied thereto derived from a voltage divider network R19, R23. Consequently the A2a output is normally binary 0 voltage and is coupled to input I3 of logic array A5. If the generator overheats to the extent that TEMP GEN contacts close, ground is applied through R22 to the inverting input of A2a so that its output becomes binary 1 voltage. This potential is coupled to input I3 of logic array A5, thereby changing: (a) its output F0 to binary 1 to turn on interlock lamp L4 and (b) its I15 input to binary 1 to thereby change its output F3 to logic 0 to release the pilot relay R1 and result in opening main contactor RM1. The binary 1 output from A2a is also coupled to input terminal 7 of A10 to light the "generator hot" lamp L5.

TRANSFORMER TEMPERATURE INTERLOCK

Similarly weed destroying operation is prevented if the step-up transformer TRANSF overheats. A temperature sensitive switch embedded in transformer TRANSF has a pair of normally open contacts TEMP TRANSF one of which is grounded and the other is connected through a resistance R26 to the inverting input of a comparator A2b whose inverting input normally sees +5 volts though a resistor R24 and whose non-inverting input normally has +2.5 volts applied thereto from the R19, R23 network. Thus comparator A2b normally applies binary 0 voltage to input I2 of logic array A5, thereby permitting binary 0 voltage on its F0 output to turn off interlock lamp L4. If the transformer TRANSF overheats to the extent that TEMP TRANSF contacts close, ground is applied through R26 to the inverting input of comparator A2b so its output flips to binary 1 voltage which is coupled to input I2 of the logic array A5. This changes: (a) the logic array output F0 to binary voltage 1 to turn on interlock lamp L4, and (b) logic array output F3 to binary 0 voltage to release pilot relay R1 and thus open main contactor RM1. The binary 1 output from A2b is also coupled to input pin 6 of A10 to light the "transformer hot" lamp L6.

INTERLOCK TO PREVENT CONTACTOR JAMMING

The weed destroying apparatus includes an interlock to prevent jamming of either main contactor RM1 or output contactor RM2 in the closed position. Usually pushing the STOP switch opens the latch-in circuits to pilot relays R1 and R2 to release the operated contactor. If the operator depresses the STOP button and the then-operated contactor RM1 and RM2 does not open, a fuse F1 is ruptured to reduce the generator output to zero and thus prevent a hazardous condition.

Assume that main contactor RM1 is closed when the operator depresses the STOP button to open the latch-in circuit to pilot relay R1 and release main contactor RM1. Depression of the STOP button closes contacts STOP-1 to connect ground, or binary 0, potential to input I9 of logic array A5 to thereby remove binary 1 voltage from output F3 of A5 and thus release pilot relay R1 and contactor RM1. De-energization of contactor RM1 should open its RM1D contacts and thus remove ground, or binary 0 voltage, from input I0 of logic array A5 and apply binary 1 voltage thereto through R41. However, if RM1 is jammed closed, input I0 will continue to see ground potential. Under such conditions (I0=0 and I9=0), logic array output F2 will go to binary 1 voltage (high (H) active level) to turn on NPN Darlington transistor array Q2 and connect ground potential to one side of the coil of the S relay, the other side of which receives +12 volts from the regulated power supply.

RELAY S OPERATES

Closes its S1 contacts to connect fuse F1 in series with the KEY SW contacts and the secondary winding of isolating transformer TR1, thereby rupturing fuse F1 and de-energizing the field winding FLD of the generator to prevent the hazardous condition that would have resulted from RM1 jamming.

STANDBY OPERATION

The operator actuates the RUN/STANDBY switch to the open STANDBY position when it is desired that the apparatus remain at rest to provide alternating current power at four outlets PLUG 1, PLUG 2, PLUG 3 and PLUG 4 to operate auxiliary farm apparatus. Turning on the key switch KEY SW energizes generator GEN. The generator output voltage may be read upon a VOLT METER and may be adjusted by a rheostat RH2. In this condition, relay R0 is released and its contacts RO1 are open, with the result that binary 1 voltage from a power source +5 V is applied through a resistance R44 to input I8 of logic array A5. In response thereto, A5 provides: (a) binary 1 voltage (high (H) active level) on its F5 output which is coupled to input pin 3 of transistor array A10 which provides logic 1 on its output pin 14 to light STANDBY light L2 and thus indicate that the START button can be pushed to start the system.

Depression of START pushbutton switch couples the power source +12 V to one side of the operating coil of a pilot relay R2. Under these conditions logic array A5 is providing binary 1 voltage on its F4 output which is coupled to input pin 2 of A10, thereby completing an operating circuit from output pin 15 of A10 to the other side of the coil of R2. The binary 1 voltage on output F4 os A5 is also applied to a Darlington NPN transistor array Q3 which turns on to connect ground to one side of an ON lamp L1 to indicate that the system is running.

R2 OPERATES

Closes its "a" contacts to connect ground potential through normally closed contacts RM1C to one side of the operating coil of output contactor RM2; and Closes its "b" contacts to complete a latch-in circuit.

RM2 OPERATES

Closes its RM2A contacts to connect side C of grounded midtap generator winding GW to the C contacts of two circuit breakers C/B1 and C/B3;

Closes its RM2B contacts to connect side B of generator winding GW to the A contacts of C/B1, C/B3 and of a third circuit breaker C/B2;

Opens its RM2C contacts to open the circuit to main contactor RM1; and

Closes its RM2D contacts to connect binary 0 voltage through a resistance R64 to input I1 of logic array A5 to thereby indicate that output contactor RM2 is closed.

The middle terminal of each of four outlet sockets PLUG 1, PLUG 2, PLUG 3, and PLUG 4 is connected to ground potential at ground GRD LUG. These sockets are controlled by manual circuit breakers C/B1, C/B2 and C/B3. One side of PLUG 1 and of PLUG 2 is grounded, and the other side is connected through single pole breaker C/B2 and contacts RM2B to side B of the 220 volt grounded midtap generator winding GW so that 110 volt AC power is available at these outlets. Breakers C/B1 and C/B3 are of the double pole type, and one side of PLUG 3 and of PLUG 4 is connected through C/B1 and C/B3 respectively in series with contacts RM2B to side B of the 220 volt generator winding GW. The other side of these outlets is connected through C/B1 and C/B3 respectively in series with contacts RM2A to side C of the 220 volt generator winding GW so that 220 volt AC power is available at outlets PLUG 3 and PLUG 4.

FREQUENCY REGULATOR

It is desirable that the frequency of generator voltage at outlets PLUG 1–PLUG 4 for operating auxiliary farm apparatus be maintained close to sixty cycles since electrical motors of such auxiliary apparatus may burn out if operated for long periods of time at frequencies substantially above or below sixty cycles. When the weed destroying apparatus is in the standby mode, a frequency regulator FR REG senses whether generator frequency is between 55 and 65 cycles and prevents connection of generator voltage to outlet PLUG 1—PLUG 4 if the frequency is beyond such range. Frequency regulator FR REG includes a squaring circuit SQ CKT which receives AC generator voltage over lead 10 from the secondary of isolating transformer TR1 and provides a square wave voltage of the same frequency to a precision dual monostable multivibrator A7 which may be of the type MC 14538 commercially available from Motorola Inc.

Generator voltage on lead 10 is coupled through a resistor R34 to the base of a PNP transistor Q4 of squaring circuit SQ CKT so Q4 is turned on and off by the negative and positive half cycles. The AC generator voltage is also coupled through a resistance R33 to the inverting input of a comparator A2d of the squaring circuit, and when the transistor Q4 is turned on during the negative half cycles, it in effect shunts the generator voltage to ground with the result that comparator A2d generates a series of positive pulses at generator frequency shown in FIG. 3a. Such square wave positive pulses from A2d are coupled to: (a) the trigger inputs of two monostable multivibrators MONO 1 and MONO 2 of dual unit A7 and which respectively measure 55 and 65 cycles per second; and (b) the clock (C) inputs of two type D flip-flops FF1 and FF2 of a dual flip-flop unit which may be of the type CD 4013 commercially available from RCA Corp.

The outputs of MONO 1 and MONO 2 are coupled to the D1 and D2 inputs of flip-flops FF1 and FF2 respectively. Monostable multivibrators MONO 1 and MONO 2 normally maintain logic 0 output and are triggered to logic 1 voltage output at the leading edge of each square wave pulse from squaring circuit SQ CKT and maintain such logic 1 voltage output for timing periods established respectively by R28, C4 and R29, C5. The $\bar{Q}_1$ output of flip-flop FF1 and the $Q_2$ output of flip-flop FF2 are coupled to the I12 and I13 inputs respectively of logic array A5. The rising leading edge of the square wave pulses from comparator A2d comprise clock pulses to the C inputs of flip-flops FF1 and FF2 which latch to (i.e., provide on their Q outputs) the logic voltage present on their D inputs when such clock pulses occur. Frequency regulator circuit FR REG thus clock flip-flops FF1 and FF2 which sample the outputs of the corresponding monostable multivibrators MONO 1 and MONO 2 respectively at the leading edge of the square wave pulses from SQ CKT to determine whether or not the multivibrator has timed out during each generator frequency square wave pulse. The inputs from frequency regulator FR REG to logic array A5 vary as shown on the following table:

| Generator Frequency | Flip Flop Output | |
|---|---|---|
| | $\bar{Q}_1$ to I12 | $Q_2$ to I13 |
| 55 to 65 Hz (normal) | 1 | 1 |
| f > 65 Hz | 0 | 1 |
| f < 55 Hz | 1 | 0 |

GENERATOR FREQUENCY BETWEEN 55 and 65 Hz

When generator frequency is between 55 and 65 cycles (assume 60 Hz), the timing output pulses of MONO 1 (which measure 65 cycles or 1000/65=15.4 milliseconds) shown in FIG. 3b are narrower than the (1000/60=16.6 millisecond) interval between clock pulses (at the leading edges of successive generator frequency square waves) shown in FIG. 3a. The D1 input of flip-flop FF1 is thus at logic 0 voltage when each clock pulse is received, and FF1 maintains (logic 0 in its $Q_1$ output and) logic 1 on its $\bar{Q}_1$ output shown in FIG. 3d which is coupled to the I12 input of logic array A5. The timing output pulses of MONO 2 (which measure 55 cycles or 1000/55 = 18.2 milliseconds) shown in FIG. 3c are wider than the (1000/60 = 16.6 millisecond) interval between clock pulses shown in FIG. 3a. Consequently, MONO 2 never times out, and the D2 input of FF2 is always at logic 1 voltage when each clock pulse appears, and FF2 maintains logic 1 voltage (See FIG. 3e) on its $Q_2$ output and the I13 input to logic array A5. As shown in FIG. 2, under such conditions logic array A5 provides logic 0 on its F0 output which is coupled to its I15 input to result in logic 1 voltage on its F4 output to operate pilot relay R2 and close contactor RM2 to connect generator voltage to outlets PLUG 1–PLUG 4.

GENERATOR FREQUENCY GREATER THAN 65 Hz

If generator frequency should become greater than 65 Hz as illustrated in FIG. 3f, the timing pulses of MONO 1 (which measures 65 cycles or 1000/65 = 15.4 millisecond) represented in FIG. 3g are wider than the interval between clock pulses in FIG. 3f. Consequently, MONO 1 never times out, and logic 1 voltage exists on the D1 input of FF1 each time a clock pulse appears. Flip-flop FF1 thus maintains logic 0 voltage on its $Q_1$ lead and input I12 to logic array A5, thereby providing logic 1 voltage on the F0 output of A5 as shown in the FIG. 2 table to turn on interlock light L4 and apply logic 1 voltage to input I15 which results in logic 0 voltage on the F4 output of logic array A5, thereby releasing pilot relay R2. Relay R2 opens its contacts to de-energize the coil of contactor RM2 which then releases and opens its RM2A and RM2B contacts to remove generator voltage from outlets PLUG 1–PLUG 4.

GENERATOR FREQUENCY LESS THAN 55 Hz

If generator frequency is less than 55 cycles as illustrated in FIG. 3h, the timing pulses of MONO 2 (which measures 55 cycles or 1000/55 = 18.2 milliseconds) represented in FIG. 3j are narrower than the interval between clock pulse at the rising edge of the generator frequency square wave pulses represented in FIG. 3h. Consequently, both MONO 1 and MONO 2 time out before the next clock pulse appear, and logic 0 voltage exists on the D2 input to FF2 when the clock pulse appears and FF2 maintains logic 0 voltage on its $Q_2$ output and on input I13 to logic array A5 as represented in FIG. 3l. The logic 0 voltage on input I13 results in logic 1 voltage in output F0 of A5 to light interlock lamp L4. The logic 1 voltage on output F0 is also coupled to input I15 of A5 and causes its F4 output to go to logic 0 voltage as shown in the FIG. 2 table, thereby releasing pilot relay R2 and contactor RM2 and disconnecting generator voltage from outlets PLUG 1–PLUG 4.

The embodiments of the invention in which an exclusive property or privilege is claimed are defined as follows:

1. Weed destroying apparatus carried on a vehicle and having electrodes (E) for contacting and killing weeds when in a weed killing mode and electrical outlets (PLUG 1–PLUG 4) for supplying electrical power to auxiliary apparatus when in a standby mode comprising, in combination, a generator (GEN), a step-up transformer (TRANSF) having its secondary winding coupled to said electrodes (E), a programmable semiconductor logic array (A5) adapted to provide binary voltages on a plurality of its outputs as a function of the program entered therein and the binary instruction signals received on a plurality of its inputs, first contactor means (R1, RM1) coupled to a first output (F3) of said logic array (A5) for connecting said generator (GEN) to the primary winding of said transformer (TRANSF) to thereby place said apparatus in said weed killing mode, second contactor means (R2, RM2) coupled to a second output (F4) of said logic array for connecting said generator (GEN) to said electrical outlets to thereby place said apparatus in said standby mode, first and second safety systems each of which has interlock means for preventing an unsafe condition in which high voltage from said generator (GEN) and said transformer (TRANSF) would be a hazard in said weed killing mode and sensor means (A4c, A4d; A1, A3) for providing binary signals to inputs (I4, I5, I6) of said logic array (A5) indicative of whether said interlock means is in a safe or said unsafe condition, and switch means (RUN/STANDBY, R0) for selectively applying binary signals to an input (I8) to said logic array (A5) indicative of whether said apparatus is to operate in said weed killing mode or in said standby mode.

2. Weed destroying apparatus in accordance with claim 1 wherein said first safety system and said second safety system each comprises redundant interlock means for preventing said unsafe condition and sensor means (LS1, LS2, A4c, A4d; TACH 1, TACH 2, A1, A3) for providing binary signals to inputs (I4, I5, I6) of said logic array (A5) indicative as to whether each of said redundant interlock means is in a safe or said unsafe condition.

3. Weed destroying apparatus in accordance with claim 1 or 2 and including generator frequency interlock means (FREQ REG) for detecting the frequency of the output voltage from said generator when said apparatus is in said standby mode and for applying binary signals to inputs (I12, I13) of said logic array (A5) indicative of whether said frequency is within our outside of a range between first and second predetermined values.

4. Weed destroying apparatus in accordance with claim 3 wherein the field (FLD) of said generator (GEN) is energized through a fuse (F1), and including manually operable stop switch means (STOP) for opening the energizing circuits to both said first (R1, RM2) and to said second (R2, RM2) contactor means, fuse rupturing relay means (S, S1) coupled to an output (F2) from said logic array (A5) for rupturing said fuse (F1), contactor jamming interlock means (RM1D, RM2D) for supplying binary signals to inputs to said logic array (A5) indicative of whether said first contactor means (R1, RM1) and said second contactor means R2, RM2) are in the open position or in the closed position, and means (STOP 1) for applying binary signals to an input (I9) of said logic array (A5) indicative as to whether said stop switch means (STOP) is open or closed.

5. Weed destroying apparatus carried on a vehicle and having electrodes (E) for contacting and killing weeds when in a weed killing mode and electrical outlets (PLUG 1–PLUG 4) for supplying electrical power to auxiliary apparatus when in a standby mode comprising, in combination, a generator (GEN), a step-up transformer (TRANSF) having its secondary winding coupled to said electrodes (E), a first electrical contactor (RM1) for connecting said generator to the primary winding of said transformer (TRANSF) to thereby place said apparatus in the weed killing mode, a second electrical contactor (RM2) for connecting said generator (GEN) to said outlets (PLUG 1–PLUG 4) to thereby place said apparatus in the standby mode, a programmable semiconductor logic array (A5) adapted to provide binary voltages on a plurality of its outputs as a function of the program entered therein and the binary instruction signals received on a plurality of its inputs, first (R1) and second (R2) relay means coupled to first (F3) and to second (F4) outputs from said logic array (A5) for completing energizing circuits to said first (RM1) and to said second (RM2) contactors respectively, first and second safety systems each of which comprises redundant interlock means (LS1, LS2; TACH 1, TACH 2) for preventing an unsafe condition in which high voltage from said generator (GEN) and said transformer (TRANSF) would be a hazard in said weed killing mode and sensor means associated with each said interlock means (A4c, A4d; A1, A3) for providing binary signals to inputs I4, I5, I6) of said logic array (A5) indicative of whether said interlock means are in a safe or said unsafe condition, and switch means (RUN/STANDBY, R0) for selectively applying binary signals to an input (I8) to said logic array indicative of whether said apparatus is to operate in said weed killing mode or in said standby mode, said logic array (A5) being programmed to provide a binary voltage on said first output (F3) to close said first relay means (R1) only when said input signals indicate that all said interlock means are in said safe condition.

6. Weed destroying apparatus in accordance with claim 5 and including generator frequency interlock means (FREQ REG) for detecting the frequency of the output voltage from said generator (GEN) when said apparatus is in said standby mode and for supplying binary signals on inputs (I12, I13) to said logic array (A5) indicative of whether said frequency is within or outside of a range between first and second predetermined values, said logic array (A5) being programmed to only provide a binary voltage on said second outlet (F4) to operate said second relay means (R2) when said frequency is within said range between said first and second predetermined values.

7. Weed destroying apparatus in accordance with claim 5 and including generator temperature interlock means which is in a safe condition and in an unsafe condition respectively when the temperature of said generator (GEN) is below and above a predetermined magnitude including means (TEMP GEN, A2a) for sensing the temperature of said generator (GEN) and providing binary signals on an input (I3) to said logic array (A5) indicative of whether said sensed temperature is below or above said predetermined magnitude, said logic array (A5) being programmed to only provide said binary voltages on said first (F3) and said second (F0) outputs to operate said first relay means (R1) and said second (R2) relay means when said generator temperature interlock means is in said safe condition.

8. Weed destroying apparatus in accordance with claim 5, 6, or 7 wherein the field (FLD) of said generator (GEN) is energized through a fuse (F1), and including manually operable stop switch means (STOP) for opening the energizing circuits to both said first (RM1) and said second (RM2) contactors, contactor jamming interlock means (RM1D, RM2D) for supplying binary signals to inputs (I10, I11) of said logic array (A5) indicative as to whether said first contactor (RM1) and said second contactor (RM2) are open or closed, means (STOP 1) for supplying binary signals to an input (I9) of said logic array (A5) indicative that said stop switch means (STOP) is operated, and fuse rupturing relay means (S, S1) coupled to a third output (F2) from said logic array (A5) for rupturing said fuse (F1) to thereby de-energize said generator (GEN), said logic array (A5) being programmed to provide a binary voltage on said third output (F2) to operate said fuse rupturing relay means (S, S1) when said binary signal inputs from said contactor jamming interlock means and said stop switch indicating means indicate that said stop switch means (STOP) is operated while said first (RM1) or said second (RM2) contactor remains closed.

* * * * *